US008807484B2

(12) United States Patent
Raposeiro et al.

(10) Patent No.: US 8,807,484 B2
(45) Date of Patent: Aug. 19, 2014

(54) GAS EXHAUST DIVERTER (75) Inventors: Hugo Alexandre Duart Mendes Raposeiro, Bristol (GB); Bruno Stefes, Bremen (DE); Holger Bammann, Buxtehude (DE); Thomas Selchert, Hamburg (DE); James Brown, Bristol (GB); Heiko Rothe, Hamburg (DE); Alexander Solntsev, Hamburg (DE)

(73) Assignee: Airbus Operations Limited, Bristol (GB)

( * ) Notice: Subject to any disclaimer, the term of this patent is extended or adjusted under 35 U.S.C. 154(b) by 190 days.

(21) Appl. No.: 13/388,144

(22) PCT Filed: Aug. 2, 2010

(86) PCT No.: PCT/EP2010/061227
§ 371 (c)(1),
(2), (4) Date: Jan. 31, 2012

(87) PCT Pub. No.: WO2011/018381
PCT Pub. Date: Feb. 17, 2011

(65) Prior Publication Data
US 2012/0126061 A1 May 24, 2012

(30) Foreign Application Priority Data
Aug. 11, 2009 (GB) .................................. 0914031.0

(51) Int. Cl.
B64D 1/00 (2006.01)

(52) U.S. Cl.
USPC ......... 244/136; 244/12.5; 244/129.1; 60/694; 60/770

(58) Field of Classification Search
USPC ................... 244/12.5, 58, 118.5, 129.1, 136; 60/226.3, 262, 264, 265.19, 770, 782, 60/697, 785, 694
See application file for complete search history.

(56) References Cited

U.S. PATENT DOCUMENTS

| 2,207,242 | A | 7/1940 | De Seversky |
| 2,231,239 | A | 2/1941 | Wright et al. |
| 2,555,127 | A | 5/1951 | Gunther et al. |
| 2,924,537 | A | 2/1960 | Wallis et al. |

(Continued)

FOREIGN PATENT DOCUMENTS

| FR | 2555127 | 5/1985 |
| GB | 1348748 | 3/1974 |
| GB | 2112077 | 7/1983 |

OTHER PUBLICATIONS

Search Report for GB0914031.0 dated Dec. 2, 2009.

(Continued)

Primary Examiner — Timothy D Collins
Assistant Examiner — Nicholas McFall
(74) Attorney, Agent, or Firm — Lowe Hauptman & Ham, LLP (57) ABSTRACT An aircraft comprises an outer aerodynamic surface and an exhaust duct having an opening in the outer aerodynamic surface. The duct has a duct wall curved at the opening so as to blend with the aerodynamic surface downstream of the duct. At least one fixed flow diverter is provided for diverting high temperature exhaust gas exiting the duct away from the aerodynamic surface immediately downstream of the duct opening. The curved duct wall provides low aerodynamic drag in cruise. The flow diverter(s) give aircraft designers freedom in terms of where the duct opening can be positioned without compromising the structural integrity of the aircraft through excessive heating of the aerodynamic surface immediately downstream of the duct opening.

18 Claims, 6 Drawing Sheets (56) References Cited

U.S. PATENT DOCUMENTS 4,456,203 A    6/1984   Louthan
4,864,820 A    9/1989   Wynosky et al.
2008/0314060 A1  12/2008  Parikh 2008/0314090 A1  12/2008  Parikh

OTHER PUBLICATIONS

International Search Report and Written Opinion of PCT/EP2010/061227 dated Jun. 1, 2011.

Section A - A

Section C - C

GAS EXHAUST DIVERTER

RELATED APPLICATIONS

The present application is a National Phase of International Application Number PCT/EP2010/061227, filed Aug. 2, 2010 and claims priority from, British Application Number 0914031.0, filed Aug. 11, 2009.

FIELD OF THE INVENTION

The present invention relates to an aircraft having a gas exhaust duct which opens in an aerodynamic surface of the aircraft.

BACKGROUND OF THE INVENTION

Many transport aircraft have an Environmental Control System (ECS) for controlling the air supply, temperature and pressure within the cabin and/or cargo compartment. The ECS produces hot exhaust gases, which are ducted to exit from an aerodynamic outer surface of the aircraft. Often, the ECS has two exhaust ducts.

The hot gas exhaust from the ECS can reach temperatures of up to around 240 degrees Celsius. Some cooling of the hot gas exhaust by mixing with free stream air occurs immediately downstream of the duct opening. Traditional metallic aircraft materials such as aluminium are sufficiently tolerant to these elevated temperatures. Composite materials, such as carbon fibre reinforced plastic, which are being increasingly used for both primary and secondary aircraft structures, are less tolerant to these high temperatures. The maximum design temperature of fibre reinforced composite materials varies according to, for example, the resin of the composite, and whether they are to be used as primary or secondary structures. Secondary structures can accept higher temperatures without impacting on the structural capability of the aircraft. Careful positioning of the ECS exhaust ducts in front of composite secondary structures (such as the belly fairing) can lead to tolerable temperatures of less than around 200 degrees Celsius immediately downstream of the duct opening.

However, such careful positioning of the ECS exhaust ducts is not always available to aircraft designers. In the case of a high wing aircraft, space limitations may require that the ECS exhaust ducts need to be positioned immediately in front of composite primary structures, such as the centre wing box, upper wing cover and front spar. This could result in excessive heating of some fibre-reinforced composite materials, which are rated to withstand temperatures of around only 120 degrees Celsius without degradation of its mechanical properties. This problem may similarly be experienced with low wing aircraft, depending on the layout and position of the ECS exhaust ducts. Moreover, this problem is not limited to ECS exhaust ducts, but may be experienced where hot exhaust gases from any source are ducted to exit from an outer aerodynamic surface of the aircraft.

The exhaust duct opening traditionally has a sharp downstream edge at the intersection with the aerodynamic surface in which the duct opens. However, this sharp edge leads to increased drag in cruise. One solution to the drag problem would be to curve the duct wall at the opening so as to blend with the aerodynamic surface downstream of the duct. However, curving the duct wall has been found to exacerbate the problem of excessive heating of structures immediately downstream of the duct opening, as the hot exhaust gases no longer encounter a separation edge upon exiting the duct.

SUMMARY OF THE INVENTION

The invention provides an aircraft comprising an outer aerodynamic surface, an exhaust duct having an opening in the outer aerodynamic surface and having a duct wall curved at the opening so as to blend with the aerodynamic surface downstream of the duct, and at least one fixed flow diverter for diverting high temperature exhaust gas exiting the duct away from the aerodynamic surface immediately downstream of the duct opening.

The invention is advantageous in that the flow diverter(s) divert the exhaust gas exiting the duct away from the aerodynamic surface. The curved duct wall can be used to provide low aerodynamic drag in cruise, whilst the flow diverter(s) give aircraft designers the freedom in terms of where the duct opening can be positioned without compromising the structural integrity of the aircraft through excessive heating of the aerodynamic surface immediately downstream of the duct opening. The flow diverter is fixed, i.e. non-movable, with respect to the duct.

For example, the duct opening could be provided in front of the aircraft primary structure, which is generally less tolerant to the high temperatures of the hot gas exhaust. This would be especially beneficial where composite material is used for the structure forming the aerodynamic surface downstream of the duct opening. Therefore, the duct opening could even be safely provided immediately in front of a composite primary structure formed of carbon fibre reinforced plastic, for example.

In a preferred embodiment, the flow diverter(s) include an upstream flow diverter, which diverts the exhaust gas prior to exiting the duct away from the aerodynamic surface immediately downstream of the duct opening. This is particularly beneficial when the aircraft is stationary, or moving at low forward speed, as the curved duct wall would otherwise tend to train the hot exhaust gas exiting the duct onto the aerodynamic surface immediately downstream of the duct opening.

The upstream flow diverter may be attached, or integrally formed with, the duct wall. The upstream flow diverter preferably is generally wedge-shaped, and in one embodiment has a separation edge. The separation edge promotes separation of the hot gas exhaust from the flow diverter, and so inhibits entrainment of the exhaust by the curved duct wall onto the aerodynamic surface. The flow diverter may have a concave surface facing towards the interior of the duct, which may extend between the duct wall and the separation edge. The concave surface may smoothly transition with the duct wall at its upstream edge.

In a preferred embodiment, the flow diverter(s) include a downstream flow diverter adapted to divert the exhaust gas immediately after exiting the duct. In a particularly preferred embodiment, the downstream flow diverter is used in combination with the upstream flow diverter. The downstream flow diverter may take many different forms, but essentially each is adapted to protect the aerodynamic surface immediately downstream of the duct opening from excessive heating by the gas exhaust, by diverting the exhaust away from the surface. The forward speed of the aircraft would otherwise cause the free stream flow to direct the hot exhaust gas onto the surface.

In one embodiment, the downstream flow diverter is mounted on the aerodynamic surface immediately downstream of the duct opening. The flow diverter may include a block of insulating material. The block may include an upstream facing ramp to divert the exhaust gas away from the aerodynamic surface. The insulating material may be a solid, unitary item fixed to the aerodynamic surface, for example.

Alternatively, the block of insulating material may include a stack of different insulating materials.

In another embodiment, the downstream flow diverter may include a heat shield for diverting the exhaust gas away from the aerodynamic surface, and for forming an insulating air gap between the surface and the exhaust gas. The heat shield may be mounted on the aerodynamic surface immediately downstream of the duct opening. The heat shield may include an inverted, substantially U-shaped channel comprising side walls, which support a cross member above the aerodynamic surface. At its upstream end, the cross member may meet with the aerodynamic surface at the downstream edge of the exhaust duct opening so as to form a ramp to divert the exhaust gas over the outer surface of the cross member and so away from the aerodynamic surface. The heat shield may be attached to the aerodynamic surface by the downwardly extending side walls. The side walls may have one or more inspection through-holes for in-service inspection of the condition of the aerodynamic surface. The heat shield may also include a layer of insulating material, or a stack of different insulating materials, on the cross member.

In a further embodiment, the downstream flow diverter may include a heat shield for diverting the exhaust gas away from the aerodynamic surface, and for diverting free stream air over the aerodynamic surface immediately downstream of the exhaust duct opening. The heat shield may include a substantially U-shaped channel comprising side walls, which support a cross member above the aerodynamic surface. At its upstream end, the cross member may meet with the aerodynamic surface at the downstream edge of the exhaust duct opening so as to form a ramp to divert the exhaust gas over the outer surface of the cross member and so away from the aerodynamic surface. The upstream end of the channel may have one or more free stream air intakes, and the downstream end may be open so as to ventilate the interior of the channel between the aerodynamic surface and the cross member with free stream air. The heat shield may be attached to the aerodynamic surface by the downwardly extending side walls. The side walls may have one or more inspection through-holes for in-service inspection of the condition of the aerodynamic surface. The heat shield may also include a layer of insulating material, or a stack of different insulating materials, on the cross member.

In a yet further embodiment, the downstream flow diverter may include ducting for diverting free stream air over the aerodynamic surface immediately downstream of the exhaust duct opening. The flow diverter may include a plenum chamber disposed beneath the aerodynamic surface. Free stream air may be ducted from intakes into the plenum chamber, which exits to form a cooling film of air over the aerodynamic surface immediately downstream of the exhaust duct opening. The intakes may be disposed on either side of the exhaust duct opening. The cooling film of air separates the hot exhaust gas from the aerodynamic surface until mixing with the free stream air cools the hot exhaust gas to a temperature sufficiently low to avoid damage to the aerodynamic surface.

A flap may be provided movable between an open and a closed position over the exhaust duct opening. This may be actively controlled according to the forward speed of the aircraft. At low or zero forward speed and with the ECS operating, the flap may be fully open, whilst during cruise, the flap may be partially closed to reduce drag. When the ECS is off, the flap may be in the fully closed position.

The aircraft structure having the aerodynamic surface immediately downstream of the duct opening may be formed of composite material, such as carbon fibre-reinforced plastic, for example.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
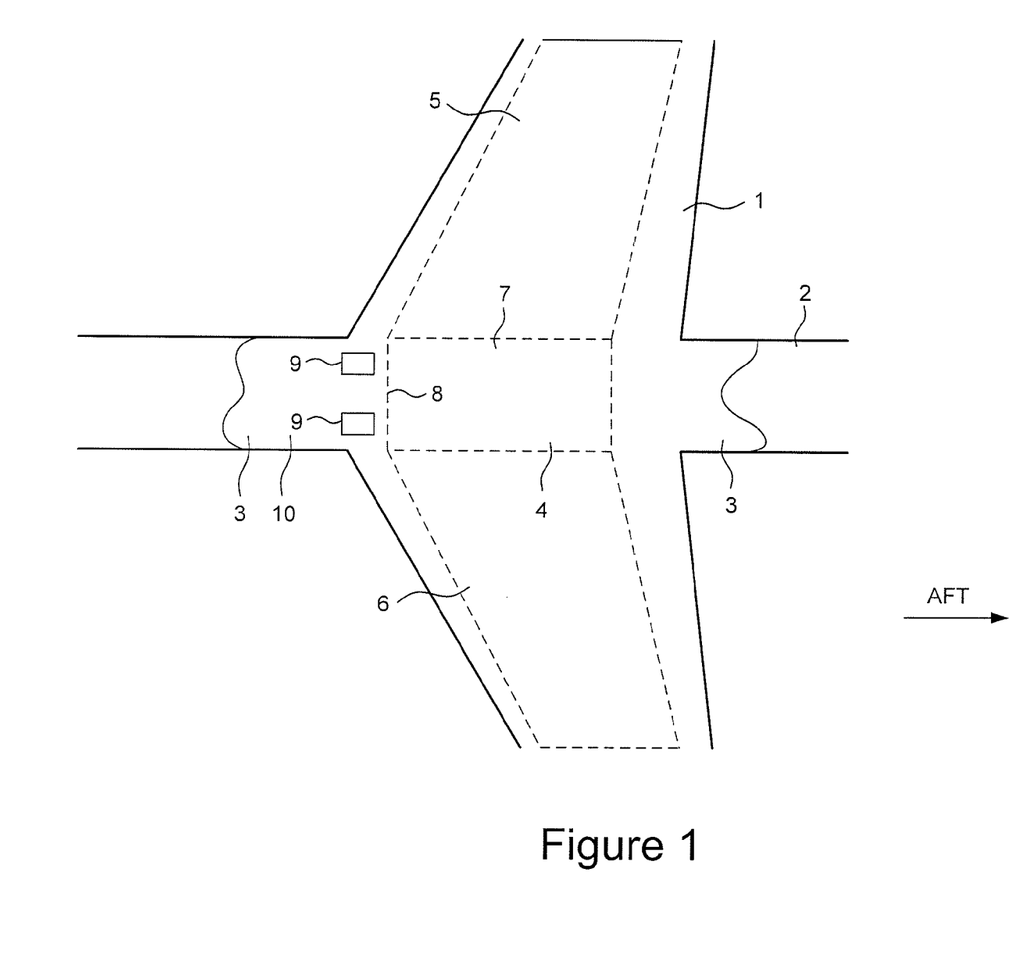
FIG. 1 illustrates a partial plan view of a high wing aircraft, showing the position of two ECS exhaust outlets upstream of the centre wing box.

FIG. 1 shows a partial plan view of a high wing aircraft. The aircraft wing 1 is mounted above the fuselage 2 and a wing-body fairing 3 forms a smooth aerodynamic surface at the intersection between the wing 1 and the fuselage 2. The wing 1 has a conventional wing box structure comprising a centre wing box 4, a right wing box 5, and a left wing box 6. The outline of the wing boxes is shown in broken line in FIG. 2. The centre wing box 4 includes inter alia an upper wing cover 7 and a front spar 8 (shown in broken line). The aircraft includes an environmental control system (ECS) having two hot exhaust gas outlets 9 positioned immediately upstream of the centre wing box front spar 8 and upper wing cover 7. The exhaust outlets 9 each comprise an exhaust duct having an opening in the outer aerodynamic surface.

Figure 2:
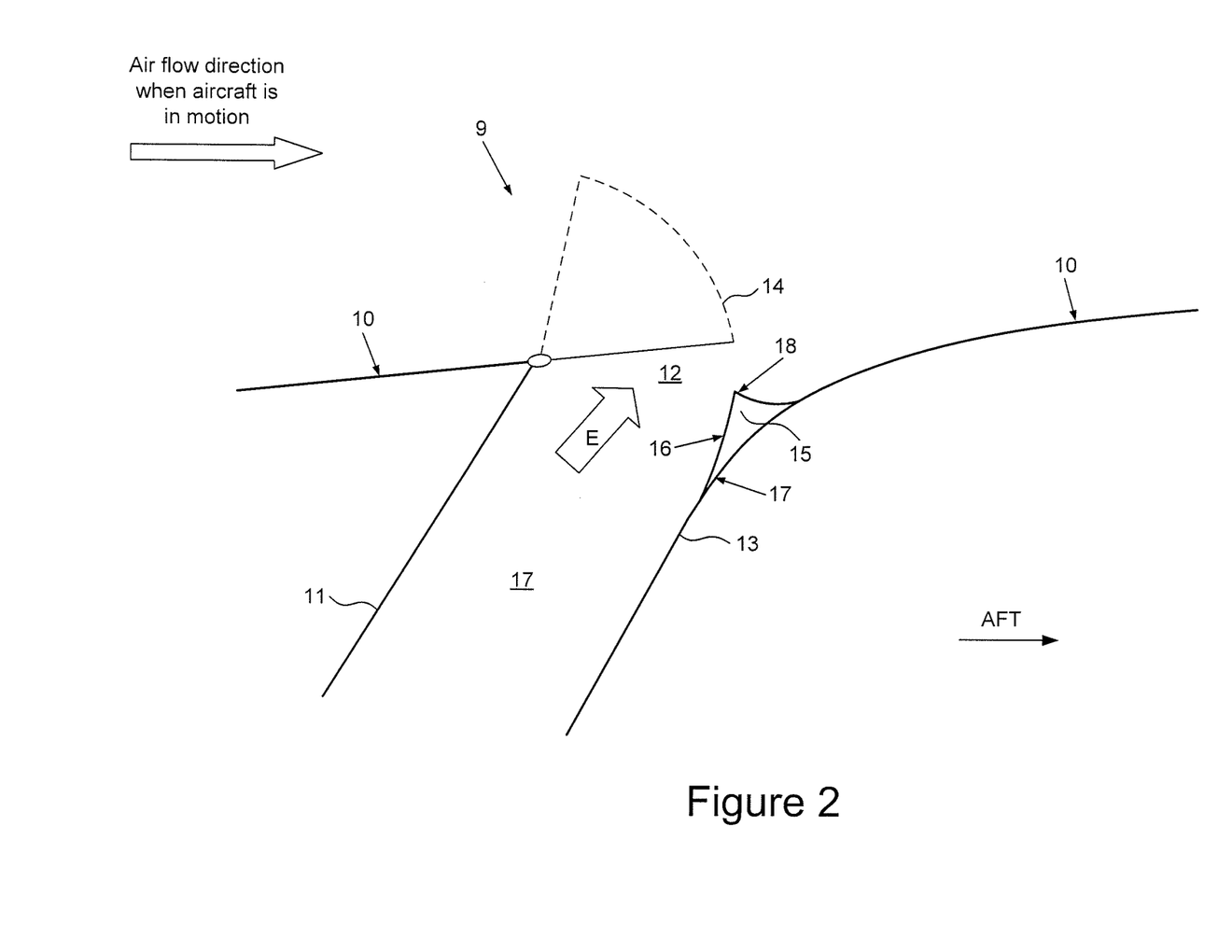
FIG. 2 illustrates a partial section view of one of the ECS exhaust ducts having an opening in the outer aerodynamic surface of the aircraft, a flap over the duct opening shown in a partially open position (solid line) and in a fully open position (broken line), and an upstream flow diverter located within the duct.

The exhaust outlets 9 will now be described in greater detail. FIG. 2 shows a cross-section through one of the exhaust outlets 9. A substantially rectangular section exhaust duct 11 is adapted to carry hot exhaust gas E from the ECS (not shown). The exhaust duct 11 has an opening 12 in the outer aerodynamic surface 10. The downstream duct wall 13 is curved at the opening so as to blend with the aerodynamic surface 10 downstream of the duct 11. The duct 11 is inclined towards the aircraft aft direction. A flap 14 is pivotally mounted at the intersection between the duct 11 and the aerodynamic surface 10 at the forward side of the opening 12. The flap 14 is movable between a closed position and an open position. In FIG. 2, the flap 14 is shown in a partially open position (solid line) and in its fully open position (broken line). In its fully closed position, the flap 14 rests against the curved duct wall 13. The flap 14 is actively controlled to move between the open and closed positions under the control of an actuator (not shown). The flap 14 is in its fully open position when the ECS is running and the aircraft is stationary or at low forward speed. The flap 14 is fully closed when the ECS is not operating. The flap 14 is in its partially open position, as shown in FIG. 2, when the aircraft has significant forward speed, such as during cruise. Controlling the flap 14 to the partially closed position significantly reduces aerodynamic drag during cruise, as compared with the fully open position.

As can be seen from FIG. 2, an upstream flow diverter 15 is positioned within the duct 11 just upstream of the opening 12. The upstream flow diverter 15 is substantially wedge-shaped. The upstream flow diverter 15 is either attached, or integrally formed with, the curved duct wall 13. Where the upstream flow diverter 15 is a separate component, it may be riveted to the duct wall 13, for example. The upstream diverter 15 is a solid component formed of conventional aerospace materials, such as aluminium or titanium, for example. However, it will be appreciated that the upstream flow diverter may be hollow, and may be formed of different materials, for example ceramics.

The upstream flow diverter 15 has a primary surface 16 facing towards the interior 17 of the duct 11. The upstream flow diverter 15 is tapered towards its upstream edge 17, such that the primary surface 16 smoothly transitions with the duct wall 13. The primary surface 16 is preferably slightly concave but may be substantially planar. At the downstream end of the primary surface 16 is a separation edge 18. The separation edge 18 is adapted to cause separation of the flow of hot exhaust gas E exiting the duct 11 such that it is not entrained by the curvature of the duct wall 13. To that end, the separation edge 18 is preferably sharp. In the embodiment shown in FIG. 2, the upstream flow diverter 15 forms an angle of approximately 90 degrees at the separation edge 18. However, it will be appreciated by those skilled in the art that a greater or lesser angle than 90 degrees may be suitable so long as a relatively sharp separation edge is formed. However, it is desirable that the primary surface 16 of the upstream flow diverter 15 turns the hot exhaust gas E to a direction approximately perpendicular to the aerodynamic surface 10 at the separation edge 18 so as to best protect the surface 10 downstream of the duct opening 12.

The upstream flow diverter 15 is particularly effective when the aircraft is at low or zero forward speed and the flap 14 is in the fully open position (shown in broken line in FIG. 2). The upstream flow diverter 15 is also effective in failure cases when the flap 14 does not fully open when the aircraft is at low or zero forward speed. When the aircraft is at low or zero forward speed the cooling effect of any free stream airflow over the aerodynamic surface 10 on the hot exhaust gas E is low. Protecting the aerodynamic surface 10 immediately downstream of the duct opening 12 when the aircraft is at low or zero forward speed using the upstream flow diverter 15 is therefore highly beneficial so as to avoid heat damage to the aerodynamic surface 10.

Although not shown in FIG. 2, a downstream flow diverter may be used to divert the hot exhaust gas E immediately after it has exited the duct 11. Indeed, the downstream flow diverter may be used in addition to, or as an alternative to, the upstream flow diverter 15. The downstream flow diverter may take a number of different forms, and four alternative embodiments of the downstream flow diverter will now be described with reference to FIGS. 3 to 6.

Figure 3:
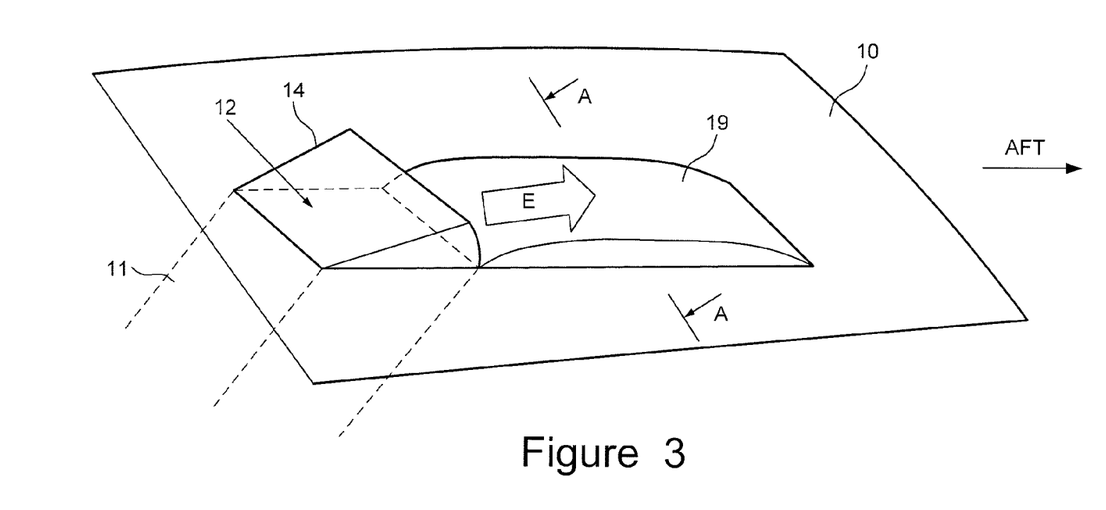
FIG. 3 illustrates a partial perspective view of the exhaust duct opening, the flap and a downstream flow diverter in accordance with a first embodiment mounted on the outer aerodynamic surface immediately downstream of the duct opening.

FIG. 3 shows the duct 11 having the opening 12 in the outer aerodynamic surface 10, and the flap 14 in the partially open position. A first embodiment of a downstream flow diverter 19 is mounted on the aerodynamic surface 10 immediately downstream of the duct opening 12. The first downstream flow diverter 19 comprises a mono-block shield of insulating material. The mono-block has tapered, rounded edges facing forward, aft and to either side so as to provide a minimal aerodynamic drag impact.

Figure 3A:
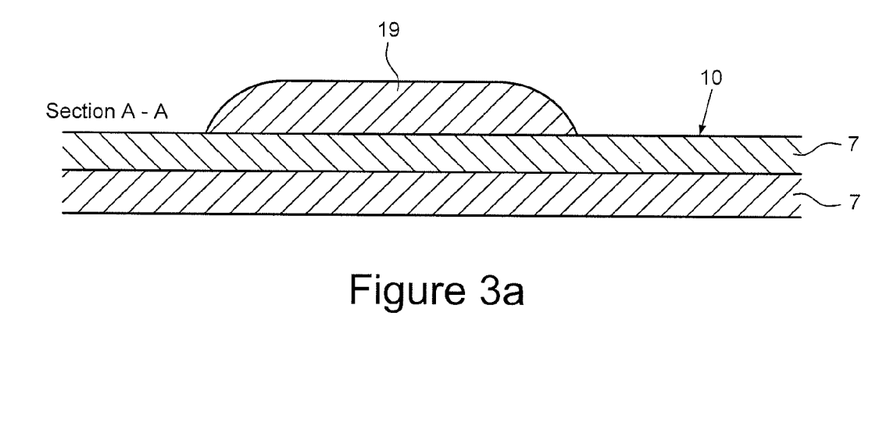
FIG. 3a illustrates a section view along A-A of FIG. 3.

A cross-section view along A-A in FIG. 3 is shown in FIG. 3a, which shows the composite plies of the centre wing box upper cover 7. These may be formed of carbon fibre-reinforced plastic, for example. The surface 10 of centre wing box upper cover 7 immediately downstream of the exhaust duct opening 12 is protected from the hot exhaust gas E emerging from the duct 11 by the downstream flow diverter 19, which diverts the hot exhaust gas E away from the surface 10 and insulates the surface 10 from the high temperatures of the exhaust gas E. The mono-block typically has a maximum thickness of around 10 to 20 mm. The mono-block may comprise carbon fibre-reinforced plastic (CFRP) with high temperature resistance resins or a protective foam. The choice of material for the mono-block is selected since the component does not carry a high stress level, unlike the primary structure which has low temperature resistance resins. The flow diverter 19 therefore provides a relatively lightweight solution with negligible drag impact.

Figure 4:
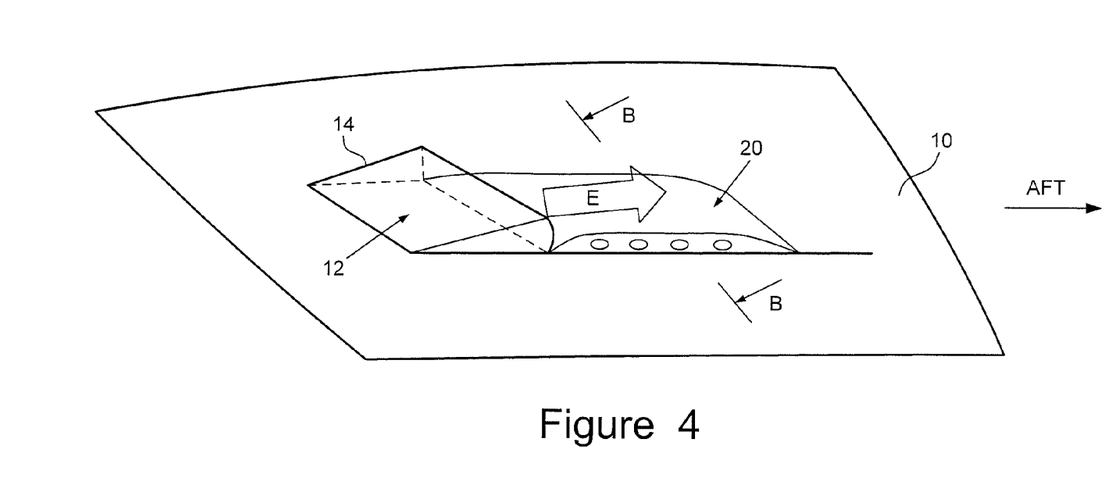
FIG. 4 illustrates a partial perspective view of the exhaust duct opening, the flap and a downstream flow diverter in accordance with a second embodiment mounted on the outer aerodynamic surface immediately downstream of the duct opening.

FIG. 4 illustrates a second embodiment of a downstream flow diverter 20. FIG. 4 shows the duct opening 12 in the aerodynamic surface 10 and the flap 14 in the partially open position. The second downstream flow diverter 20 is mounted on the surface 10 immediately downstream of the duct opening 12.

Figure 4A:
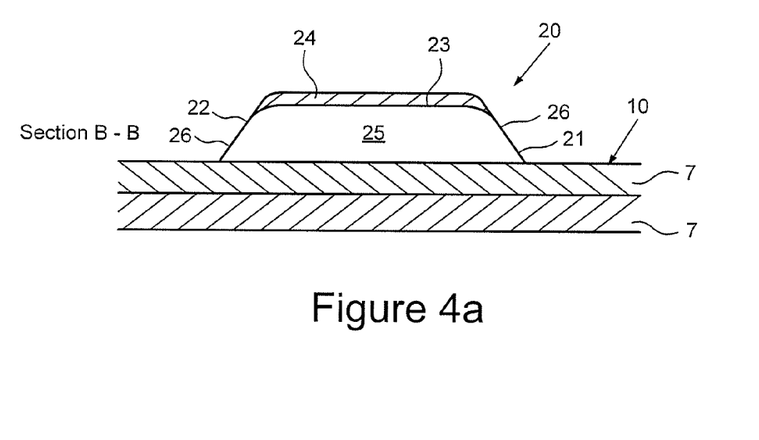
FIG. 4a illustrates a section view along B-B of FIG. 4.

A cross-section view along B-B in FIG. 4 is shown in FIG. 4a. The second downstream flow diverter 20 comprises a heat shield 21 having a generally upturned U-shaped configuration. Forward and aft edges of the heat shield 21 extend to the surface 10. The heat shield 21 is mounted on the surface 10 by downwardly extending side walls 22 which support a cross member 23 above the surface 10. A block of insulating material 24 is mounted on the cross member 23. The heat shield could be made of titanium, aluminium or CFRP with high temperature resistance resins since it does not carry high stress loads. The insulating material could be a protective foam. The heat shield 21 provides an air gap 25 inside the heat shield 21 to provide insulation. The downstream flow diverter 20 is advantageous in that through holes 26 in the side walls 22 allow for inspection of the surface 10 during service. In this way, it can be ensured that the hot exhaust gas E exiting the duct 11 is not causing thermal damage to the surface 10.

Figure 5:
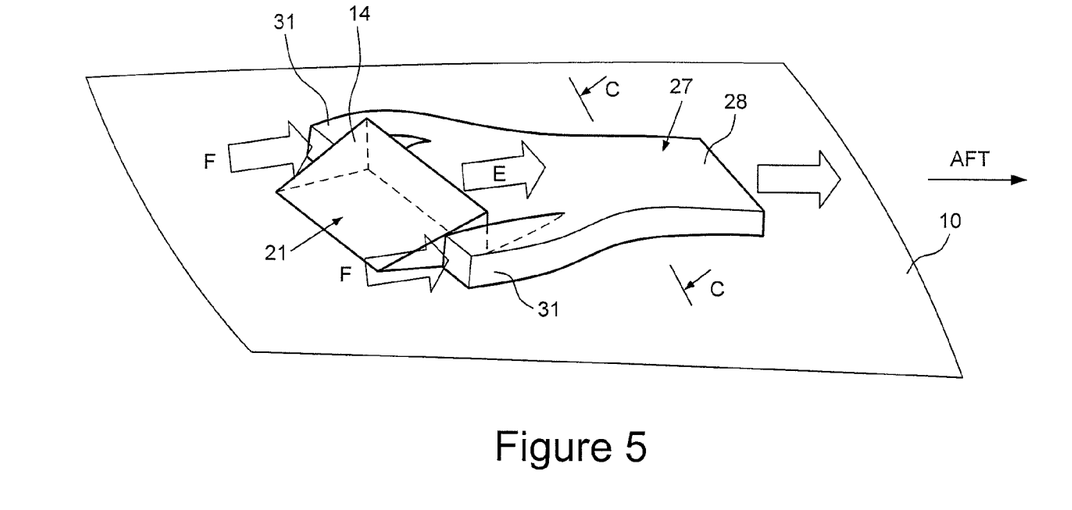
FIG. 5 illustrates a partial perspective view of the exhaust duct opening, the flap and a downstream flow diverter in accordance with a third embodiment mounted on the outer aerodynamic surface immediately downstream of the duct opening.

FIG. 5 shows a third embodiment of a downstream flow diverter 27. FIG. 5 shows the duct opening 12 in the aerodynamic surface 10, the flap 14 which is shown in the partially open position, and the downstream flow diverter 27, which includes ducting for diverting the exhaust gas E away from the aerodynamic surface 10, and for diverting free stream air F over the aerodynamic surface 10 immediately downstream of the exhaust duct opening 12.

Figure 5A:
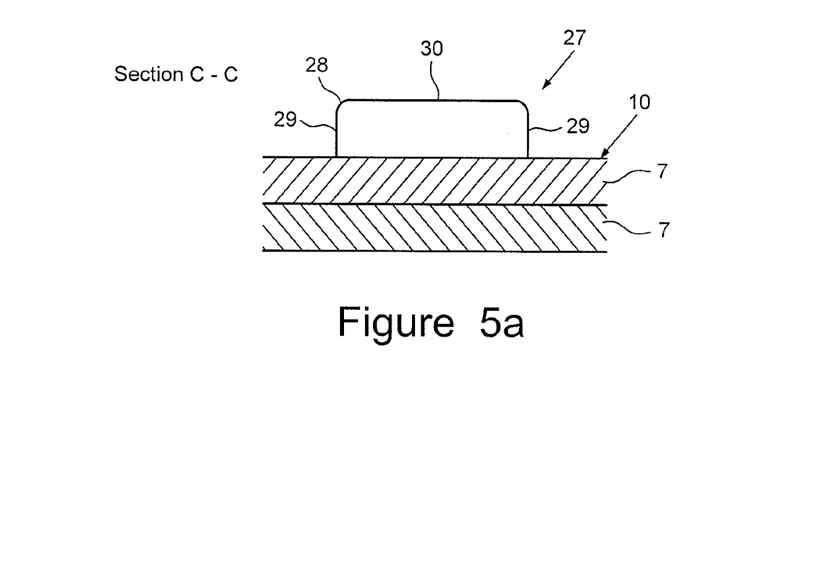
FIG. 5a illustrates a section view along C-C of FIG. 5.

A cross-section view along C-C in FIG. 5 is shown in FIG. 5a. The downstream flow diverter 27 comprises an inverted substantially U-shaped heat shielding channel 28 comprising side walls 29 which support a cross member 30 above the surface 10. The channel 28 may be made of conventional aerospace materials, such as aluminium or titanium, for example. Although not shown in FIG. 5, a layer, or block, of insulating material may be mounted on the cross member 30, similar to the insulating material 24 of the downstream flow diverter 20. The additional insulating material may be provided where the cooling effect of ducting free stream air through the channel 28 provides insufficient insulation to protect the surface 10 from the hot exhaust gas E.

As best shown in FIG. 5, the upstream end of the channel 28 is shaped such that its forward edge extends downwardly and meets with the surface 10 at the downstream edge of the exhaust duct opening 12. This therefore forms a ramp to divert the exhaust gas E over the outer surface of the cross member 30 and away from the surface 10. The interior of the channel 28 is ventilated by ducting free stream air F from intakes 31 disposed on either side of the exhaust duct opening 12. The intakes 31 duct free stream air F into the interior of the channel 28 when the aircraft attains a forward speed so as to ventilate the interior of the channel. The channel 28 may narrow in the downstream direction to accelerate the air through the channel. The downstream end of the channel is open. The ducted free stream air F acts to cool the aerodynamic surface 10 immediately downstream of the exhaust duct opening 12.

Figure 6:
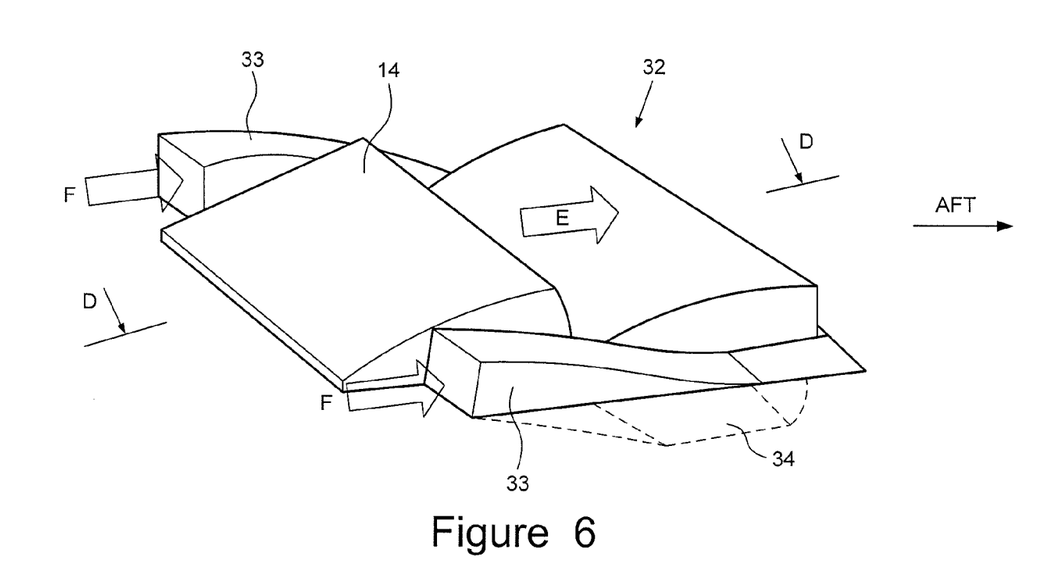
FIG. 6 illustrates a partial perspective view of the exhaust duct opening, the flap and a downstream flow diverter in accordance with a fourth embodiment mounted on the outer aerodynamic surface immediately downstream of the duct opening.

A fourth embodiment of a downstream flow diverter 32 is shown in FIG. 6. FIG. 6 shows the downstream flow diverter 32 positioned immediately downstream of the exhaust duct opening 12, and the flap 14 over the exhaust duct opening 12 is shown in the partially open position.

Figure 6A:
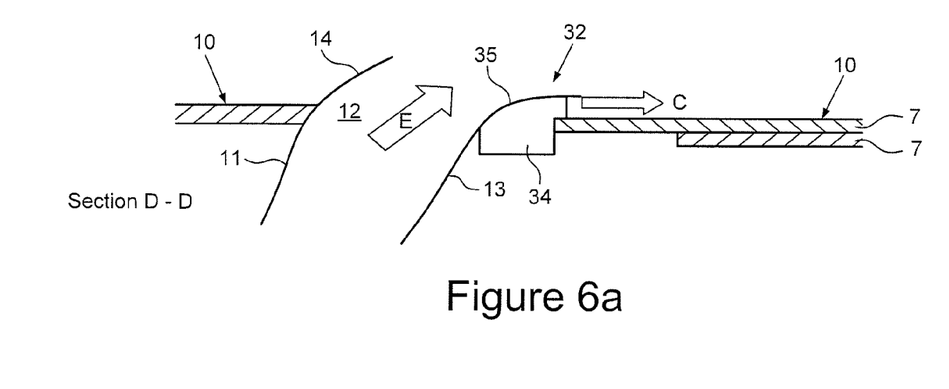
FIG. 6a illustrates a section view along D-D of FIG. 6.

A cross-section view along D-D in FIG. 6 is shown in FIG. 6a. The downstream flow diverter 32 includes a pair of intakes 33 disposed one on each side of the exhaust duct opening 12 for directing free stream air F into a plenum chamber 34 disposed beneath the aerodynamic surface 10. Free stream air F which enters the intakes 33 is directed inwardly and exits the plenum chamber 34 to form a cooling film of air C over the aerodynamic surface 10 immediately downstream of the exhaust duct opening 12. As can be seen from FIG. 6a, the plenum chamber 34 has an arcuate forward facing wall 35 which directs the hot exhaust gas E exiting the duct 11 over the cooling film of air C. The cooling film of air C separates the hot exhaust gas E from the aerodynamic surface 10 until mixing with the free stream air cools the hot exhaust gas to a temperature sufficiently low to avoid damage to the aerodynamic surface 10.

No further insulating materials are required in the downstream flow diverter 32 and so this fourth embodiment of the downstream flow diverter provides a lighter solution and easy inspection of the aerodynamic surface 10 immediately downstream of the exhaust duct opening 12. The plenum chamber 34 can be made of conventional aerospace materials, such as aluminium or titanium, for example.

Although the invention has been described above with reference to one or more preferred embodiments, it will be appreciated that various changes or modifications may be made without departing from the scope of the invention as defined in the appended claims.

The invention claimed is:

1. An aircraft comprising an outer aerodynamic surface, an exhaust duct having an opening positioned where the duct intersects with the outer aerodynamic surface and having a duct wall curved at the opening so as to blend with the aerodynamic surface downstream of the duct, and at least two fixed flow diverters for diverting exhaust gas exiting the duct away from the aerodynamic surface immediately downstream of the duct opening, wherein the at least two fixed flow diverters include an upstream flow diverter adapted to divert the exhaust gas prior to exiting the duct, and a downstream flow diverter adapted to divert the exhaust gas immediately after exiting the duct.

2. An aircraft according to claim 1, wherein the upstream flow diverter is attached to the duct wall.

3. An aircraft according to claim 1, wherein the upstream flow diverter is integrally formed with the duct wall.

4. An aircraft according to claim 1, wherein the upstream flow diverter is generally wedge-shaped.

5. An aircraft according to claim 1, wherein the upstream flow diverter has a concave surface facing towards the interior of the duct.

6. An aircraft according to claim 1, wherein the upstream flow diverter has a separation edge.

7. An aircraft according to claim 1, wherein the downstream flow diverter is mounted on the aerodynamic surface immediately downstream of the duct opening.

8. An aircraft according to claim 7, wherein the downstream flow diverter includes a block of insulating material.

9. An aircraft according to claim 7, wherein the downstream flow diverter includes a heat shield for forming an insulating air gap between the surface and the exhaust gas.

10. An aircraft according to claim 9, wherein the heat shield further includes a layer of insulating material.

11. An aircraft according to claim 9, wherein the heat shield includes through-holes for inspecting the surface.

12. An aircraft according to claim 9, wherein the downstream flow diverter further includes one or more free stream air intakes for ventilating the insulating air gap of the heat shield.

13. An aircraft according to claim 1, wherein the downstream flow diverter comprises ducting for diverting free stream air over the aerodynamic surface immediately downstream of the exhaust duct opening.

14. An aircraft according to claim 13, wherein the ducting includes one or more free stream air intakes.

15. An aircraft according to claim 13, wherein the ducting includes a plenum chamber disposed beneath the aerodynamic surface.

16. An aircraft according to claim 1, further comprising a flap movable between open and closed positions over the duct opening.

17. An aircraft according to claim 1, wherein the aerodynamic surface immediately downstream of the duct opening forms part of the primary structure of the aircraft.

18. An aircraft according to claim 1, wherein the aircraft structure having the aerodynamic surface immediately downstream of the duct opening is formed of composite material.

* * * * *